US011878399B1

United States Patent

(12) United States Patent
Klodd

(10) Patent No.: US 11,878,399 B1
(45) Date of Patent: Jan. 23, 2024

(54) WIRE RETAINING TOOL AND METHOD OF USE

(71) Applicant: Paul A. Klodd, Jefferson, IA (US)

(72) Inventor: Paul A. Klodd, Jefferson, IA (US)

( * ) Notice: Subject to any disclaimer, the term of this patent is extended or adjusted under 35 U.S.C. 154(b) by 364 days.

(21) Appl. No.: 17/247,732

(22) Filed: Dec. 21, 2020

Related U.S. Application Data

(60) Provisional application No. 62/951,696, filed on Dec. 20, 2019.

(51) Int. Cl.

| | |
|---|---|
| ***B23P 19/00*** | (2006.01) |
| ***B25B 5/06*** | (2006.01) |
| ***B25B 27/00*** | (2006.01) |
| *H01R 43/28* | (2006.01) |

(52) U.S. Cl.
CPC .............. *B25B 5/067* (2013.01); *B25B 27/00* (2013.01); *H01R 43/28* (2013.01)

(58) Field of Classification Search
CPC .... B25B 1/00; B25B 1/02; B25B 3/00; B25B 5/067; B25B 5/082; B25B 5/101
See application file for complete search history.

(56) References Cited

U.S. PATENT DOCUMENTS

| | | | | |
|---|---|---|---|---|
| 904,234 A * | 11/1908 | Sievert | B25B 1/08 81/158 |
| 3,072,396 A * | 1/1963 | McBurney | B25B 5/142 269/45 |
| 5,058,869 A * | 10/1991 | Ruthven | B25B 7/123 269/45 |
| 5,192,059 A * | 3/1993 | Silver | E04D 13/158 269/45 |
| 5,547,305 A * | 8/1996 | Treche | F16C 11/10 439/480 |
| 5,950,998 A | 9/1999 | Crabb | |
| 7,891,618 B2 * | 2/2011 | Carnevali | A47B 21/0314 248/228.6 |
| 2015/0209939 A1 * | 7/2015 | Chi-Fu | B25B 5/003 269/45 |

OTHER PUBLICATIONS

Stanley, Hand Tools Catalog, p. 142, www.stanleytools.com, last accessed on Dec. 21, 2020.

* cited by examiner

*Primary Examiner* — Lee D Wilson
(74) *Attorney, Agent, or Firm* — McKee, Voorhees & Sease, PLC

(57) ABSTRACT

A wire retaining tool includes a C-clamp adapted to be secured to a terminal structure and a wire clamp pivotally connected to the C-clamp such that when the C-clamp is secured to a terminal structure the wire clamp can be adjusted to a desired orientation to hold a wire in a convenient position to be worked on.

13 Claims, 6 Drawing Sheets

WIRE RETAINING TOOL AND METHOD OF USE

CROSS REFERENCE

This application is a nonprovisional of United States Provisional Application No. 62/951,696 filed Dec. 20, 2019.

FIELD OF THE INVENTION

The present invention relates generally to tools for working on power and communication wires.

BACKGROUND OF THE INVENTION

During the installation and maintenance of power wires at terminal boxes, switchgear, transformers and the like it is necessary for linemen to support relatively heavy wires as they perform work, such as stripping and connecting the wires. This can be cumbersome and dangerous. For example, it may be necessary for the worker to support the wire with one hand while performing work with the other. Alternatively, or in addition, workers may use their legs or other body parts to support the wire. There is a wide variety in terminal styles and approach locations for the wires, making it difficult to perfect a single technique for supporting the wires. The work could be accomplished more safely and more quickly if the worker was able to perform work with both hands.

Accordingly, there is a need for a tool and method that facilitates supporting heavy gauge wires during installation and maintenance at terminal boxes, switchgear, transformers and the like. Preferably the tool and method will permit a worker to use both hands to perform the work without the need to use one of the hands to support the wire and will also work in a variety of configurations.

SUMMARY OF THE INVENTION

Therefore, it is a principal object, feature, and/or advantage of the disclosed features to overcome the deficiencies in the art.

It is another object, feature, or advantage of the disclosed features to provide a wire supporting tool that can be used at a terminal location to support a wire while leaving a worker's hands free to perform needed work.

According to one embodiment the present invention is a wire support tool that includes a support clamp in the form of a C-clamp adapted to clamp on to a support structure, such as a terminal wall. The C-clamp includes a flange. A wire clamp is pivotally mounted to the flange such that an angle of the wire clamp relative to the C-clamp can be adjusted. In use, the C-clamp is attached to the terminal wall in a convenient location. The wire clamp is adjusted to a desired orientation to hold a wire in a desired position. The wire is then clamped in the wire clamp and the desired work may be performed. The C-clamp may include a rigid C-shaped plate with a first leg and a second leg. A movable jaw may be provided on the first leg and a fixed jaw may be mounted on the second leg, whereby the movable jaw is adjustable towards and away from the fixed jaw. The fixed jaw may include a transverse flange mounted to the second leg and at least two bearing pads mounted on the transverse flange. The wire clamp may include a stationary wire clamp jaw and an adjustable wire clamp jaw. The stationary wire clamp jaw may be mounted to a first side of a wire clamp plate. The wire clamp may further comprise a support block with a threaded opening that receives a threaded member that is attached to the movable wire clamp jaw to move the wire clamp jaw towards and away from the fixed wire clamp jaw. The support block may be supported on first and second spacers that extend from the first side of the wire clamp plate. The first spacer may be pivotally attached to the support block and may comprise a hook on a first end of the first spacer that selectively engages a catch. The wire clamp plate may be pivotally attached to the C-clamp flange. The C-clamp flange may include an arc-shaped slot engaged by an adjustable friction member to selectively fix the wire clamp plate relative to the C-clamp plate to thereby adjust an angle between the wire clamp and the c-clamp.

DETAILED DESCRIPTION OF THE EMBODIMENTS

Figure 1:
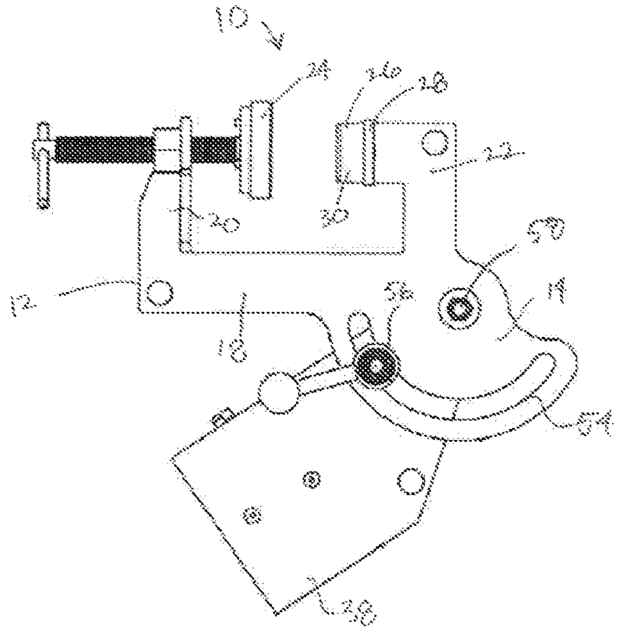
FIG. 1 is a left side elevation view of a wire retaining tool according to one embodiment of the present invention.
Figure 2:
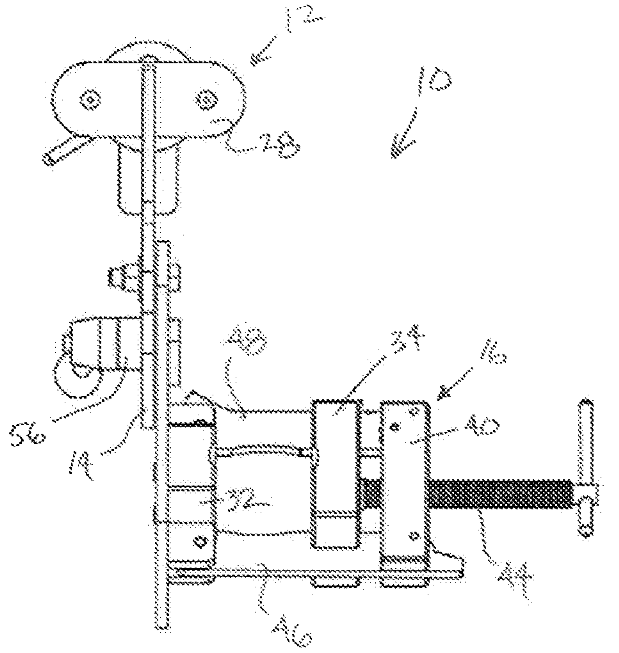
FIG. 2 is a front elevation view of the wire retaining tool of FIG. 1.
Figure 3:
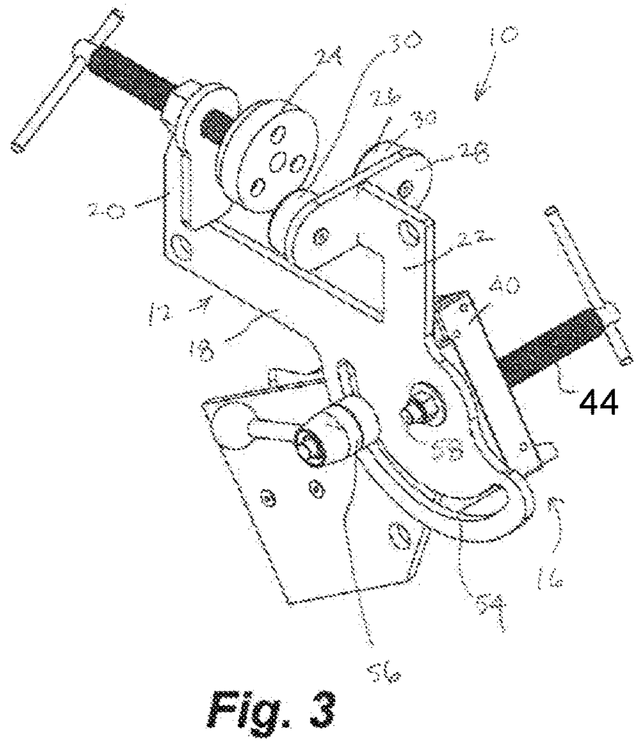
FIG. 3 is an isometric view taken generally from the left and above of the tool retaining tool of FIG. 2.
Figure 4:
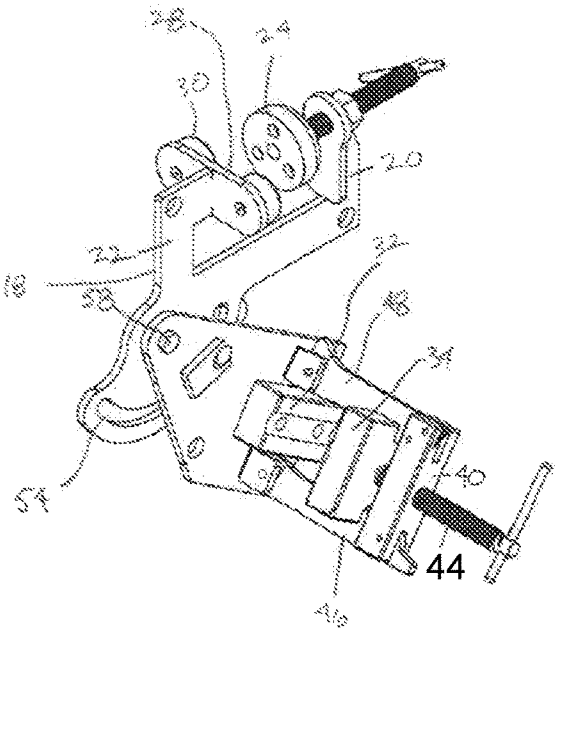
FIG. 4 is an isometric view taken generally from the right and above of the tool retaining tool of FIG. 2.

FIGS. 1-6 show a wire retaining tool 10 according to one embodiment of the invention. The tool 10 includes essentially a C-clamp 12 pivotally connected to a wire clamp 16. The C-clamp 12 acts as a support clamp that is adapted to clamp to a support structure such as a terminal wall. The C-clamp 12 includes a flange 14 that may be integrally formed with the legs 20 and 22 of the C-clamp. The flange 14 and legs 20 and 22 may be formed from a single steel plate 18, as shown. The wire clamp 16 is pivotally mounted to the flange 14 of the C-clamp 12, such that an angle of the wire clamp 16 relative to the C-clamp 12 can be adjusted. A movable jaw 24 is provided on the first leg 20 and a fixed jaw 26 is mounted on the second leg 22, whereby the movable jaw 24 is adjustable towards and away from the fixed jaw 26. The fixed jaw 26 has a transverse flange 28 mounted to the second leg 22 and at least two bearing pads 30 mounted on the transverse flange 28. The bearing pads 30 may be formed from a resilient material, such as hard rubber to act as a non-marring bearing surface that preferably has a relatively high friction coefficient. By spreading apart the bearing pads 30 on the transverse flange 28 a strong hold can be achieved that resists twisting. The movable jaw 24 may be formed from a similar material.

The wire clamp 16 includes a fixed wire clamp jaw 32 and a movable wire clamp jaw 34. The fixed wire clamp jaw 32 is mounted to a first side 36 of a wire clamp plate 38. The wire clamp 16 may further comprise a support block 40 with a threaded opening 42 that receives a threaded member 44 that is attached to the movable wire clamp jaw 34 to move the wire clamp jaw 34 towards and away from the fixed wire clamp jaw 32. The support block 40 is supported on first and second spacers 46, 48 that extend from the first side 36 of the wire clamp plate 38. As best seen in FIG. 9, the first spacer 46 may be pivotally attached to the support block 40 and may comprise a hook 50 on a first end of the first spacer 46 that selectively engages a catch 52 mounted on the plate 38. This feature permits a wire 100 (see FIG. 8) to be moved in and out of the area between the jaws 32 and 34 from the side.

The wire clamp plate 38 may be pivotally attached to the C-clamp flange 14 by a pivot member 58, such as a bolt. The C-clamp flange 14 may include an arc-shaped slot 54 engaged by an adjustable friction adjuster 56 that is fixed to the C-clamp plate 18 to selectively position the wire clamp plate 38 relative to the C-clamp plate 18 to thereby adjust an angle between the wire clamp 16 and the C-clamp 12. It should be appreciated that the slot 54 is in the shape of a portion of a circle with a radius equal to the distance between the friction member 56 and the pivot member 58. The angle between the wire clamp 16 and the C-claim 12 can be selectively fixed by tightening the friction adjuster 56 (which includes a male portion that passes through the slot 54 and a female threaded member that can be selectively loosened and tightened).

Figure 7:
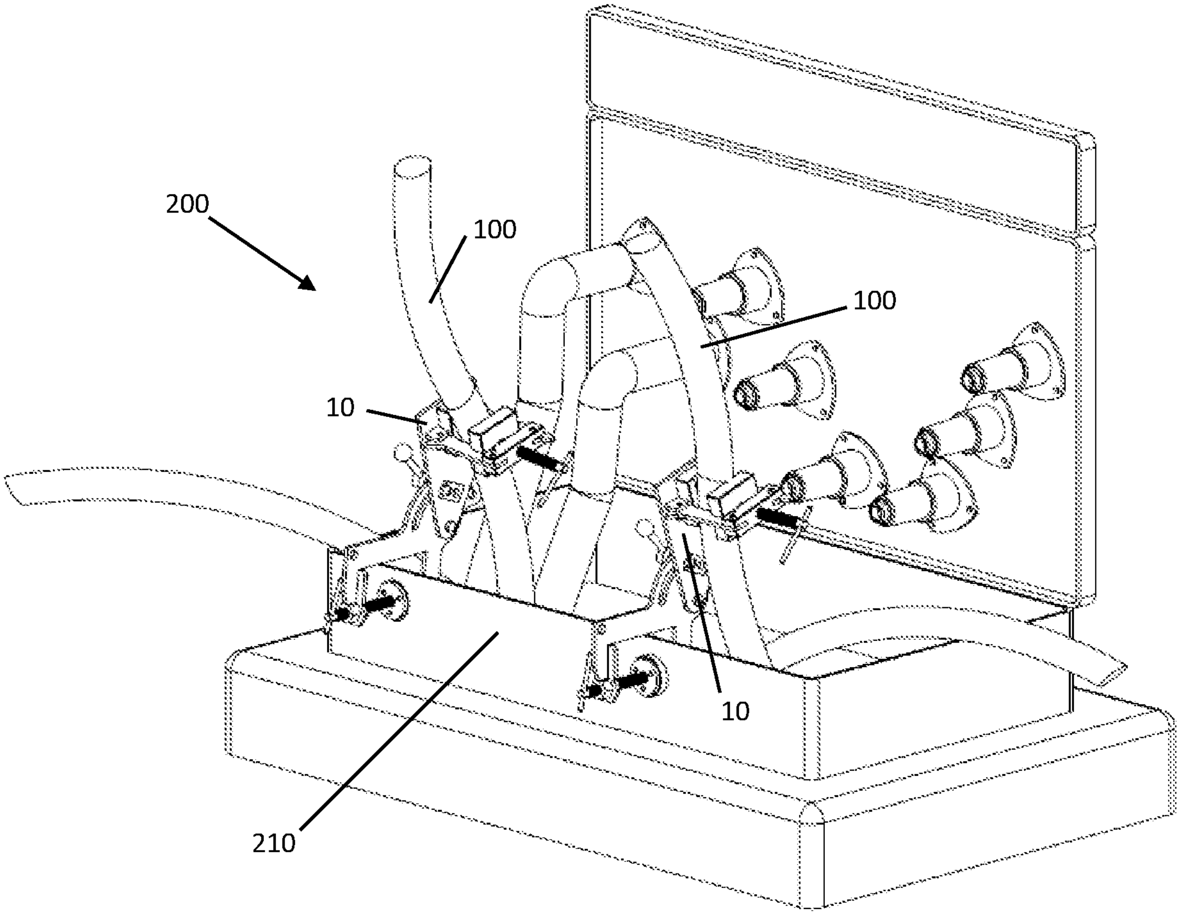
FIG. 7 is an isometric view of embodiments of a wire retaining tool according to the present invention in use retaining wires in a transformer assembly.
Figure 8:
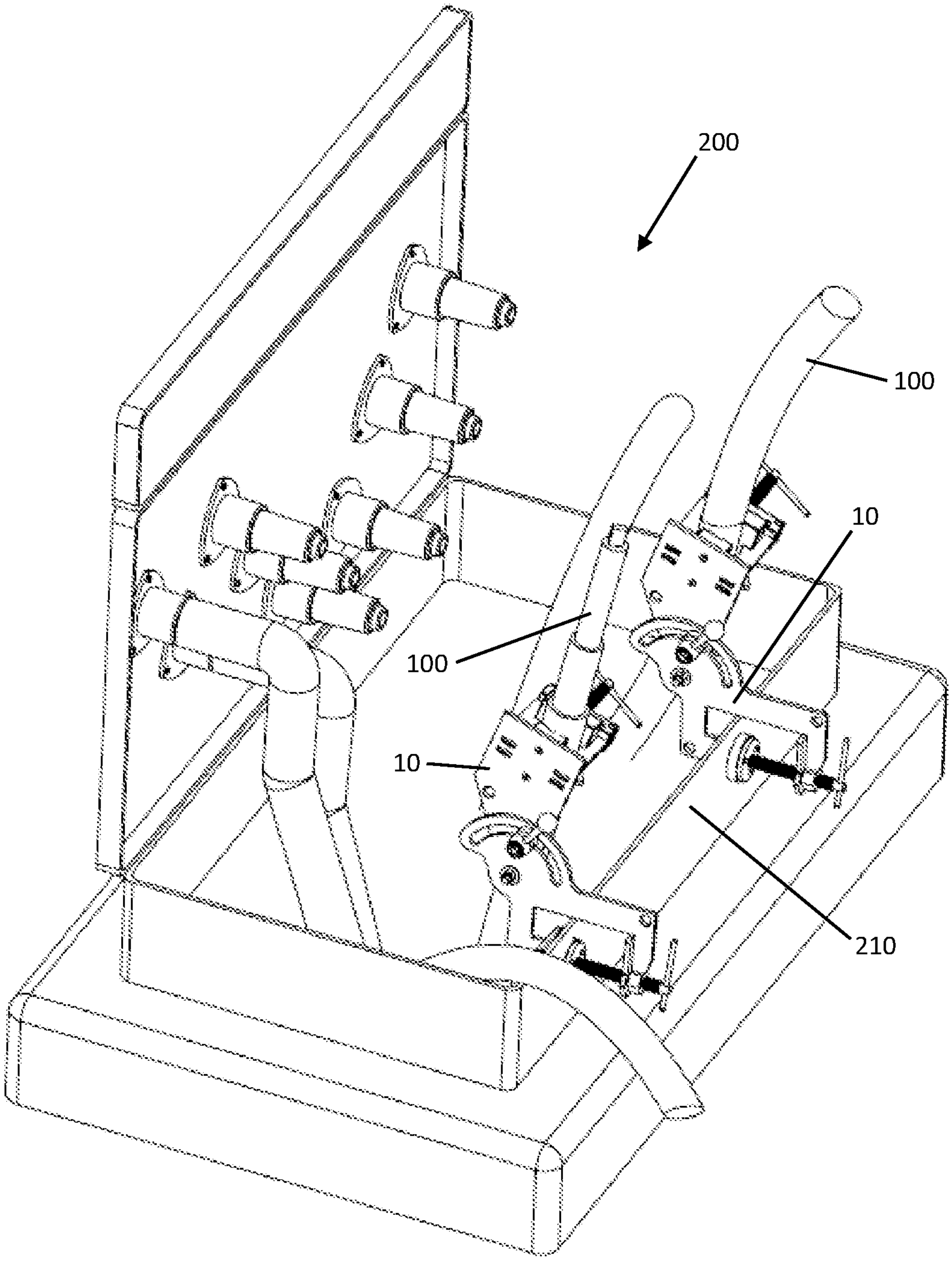
FIG. 8 is an isometric view of the wire retaining tools and transformer assembly of FIG. 7 generally from the left side of the FIG. 7 after one of the clamped wires has been stripped.
Figure 9:
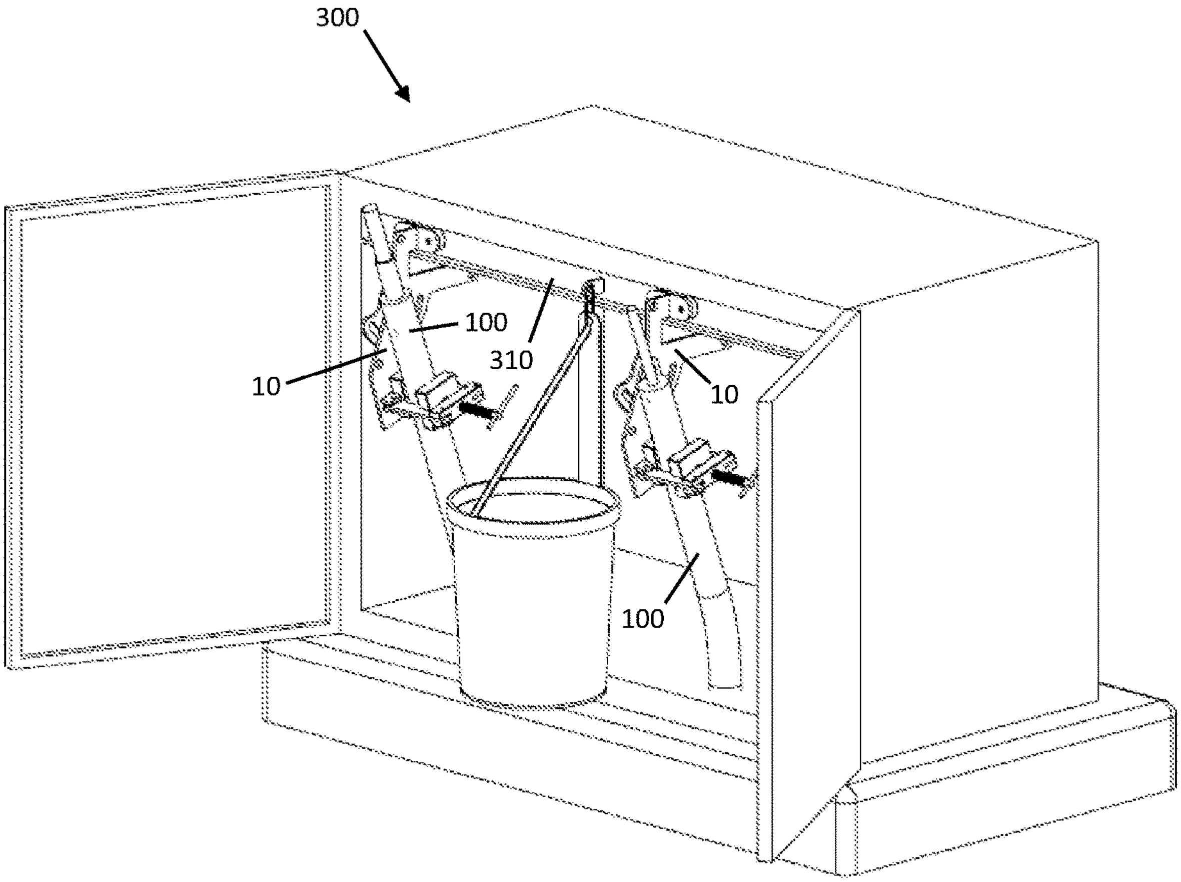
FIG. 9 is an isometric view of embodiment of a wire retaining tool according to the present invention in use retaining wires in a junction box.

FIGS. 7-9 show tools 10 in use in the field in association with a couple different types of terminal boxes. In FIGS. 7 and 8, two wire retaining tools 10 are used to support two wires 100 in a transformer assembly 200. As seen, the tools 10 are secured to a wall 210 of the assembly 200 using the C-clamp 12. The tool 10 can be positioned and secured in wide variety of locations and orientations on the terminal structure. It should also be appreciated that the tool 10 can be mounted to a wide variety of structures as is convenient, for example a back of a bucket truck, a digger derrick, tailgate of a pickup, or other equipment near the wires. FIGS. 7 and 8 show tools 10 secured to the lower rim 210 of a transformer assembly 200 to support a wire that enters the terminal from underground. FIG. 9 shows tools 10 secured to an upper wall 310 on a junction box 300 to hold the wires 100 at a convenient height to perform work on the wires 100 with both hands free.

In use, the tool 100 is secured to the terminal structure 210 or 310 using the C-clamp 12. After securing the tool 10 to the terminal structure 210 or 310 with the C-clamp 12, the wire clamp 16 is adjusted to a desired orientation by loosening the friction member 56 to permit the wire clamp plate 38 to be angularly pivoted about pivot member 58. Once the wire clamp 16 is in a desired orientation, the friction member 56 is tightened to lock the wire clamp plate 38 in position. The wire 100 can then be secured within the wire clamp 16.

Figure 5:
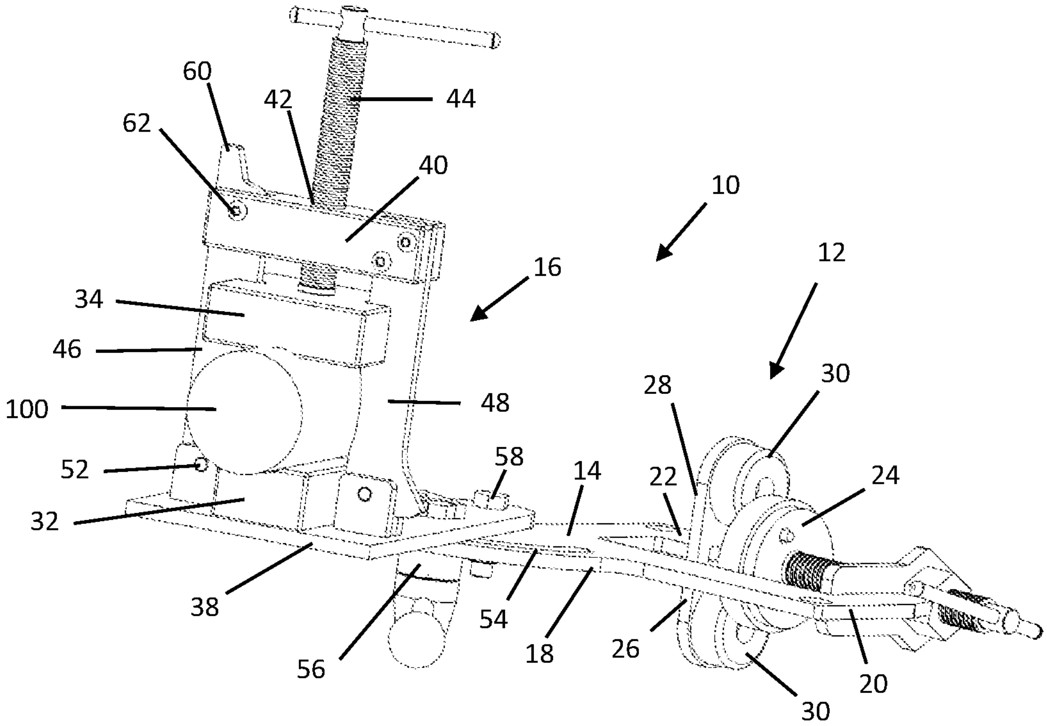
FIG. 5 is an isometric view of the tool of FIGS. 1-4 showing a portion of a wire clamped in the wire retaining jaws.
Figure 6:
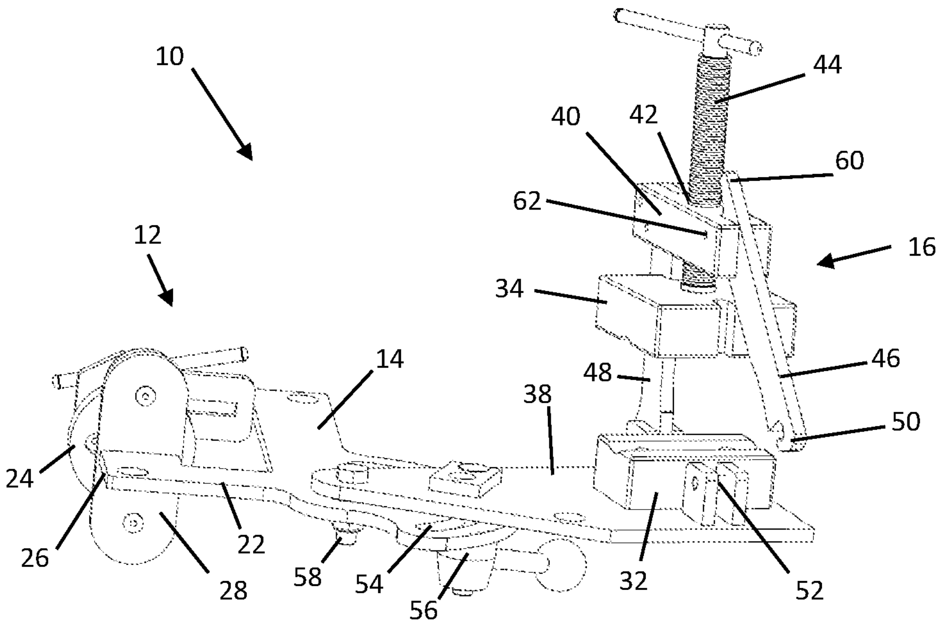
FIG. 6 is an isometric view of the tool of FIGS. 1-4 showing the wire clamp spacer rotated to an open configuration to permit a wire to be inserted to removed from the wire retaining jaws.

The securement of the wire 100 within the wire clamp 16 is best understood by reference to FIGS. 5 and 6. The movable jaw 34 is adjusted away from the fixed jaw 32 to provide a gap for the wire 100. The first spacer 46 may be rotated, as shown in FIG. 6 by pivoting it about a rotation member 62 provided in the support block 40. A finger tab 60 may be provided on the first spacer 46 to aid in pivoting the spacer 46. Pivoting the spacer 46 provides an opening to insert the wire 100 between jaws 32 and 34. The movable jaw 34 may then be tightened on to the wire 100, as shown in FIG. 5, by rotating the rotatable member 44 to draw the movable jaw 32 towards the fixed jaw 32. The first spacer 46 may then be rotated to the closed position of FIG. 8. The first spacer 46 includes a hook 50 at its free end that engages a catch 52 that is secured to the wire clamp plate 38 to retain the spacer 46 in a closed position.

With the wire 100 thusly secured in the tool 10, a user is able to perform work on the wire 100 such as stripping the wire, fitting it with connectors, and connecting the free end of the wire 100 to the terminal. It is much safer and more convenient that using only the worker's hands and has been found to be much safer and quicker for performing work. When work is completed, the wire clamp 16 can be loosened and the first spacer 46 adjusted to an open configuration and the wire 100 can be removed from the tool 100. The C-clamp 12 can then be loosened and the tool 100 can be removed from the terminal and reused.

Thus, various configurations and methods of using a wire retaining tool have been shown and described. It should be appreciated that the systems shown and described are for exemplary purposes. It is contemplated that numerous variations, changes, and otherwise, which are obvious to those skilled in the art are to be considered part of the present invention.

What is claimed is:

1. A wire support tool comprises:

a support clamp comprising a C-clamp adapted to clamp to a support structure, the support clamp comprising a fixed jaw and movable jaw that moves towards and away from the fixed jaw on a support clamp adjustment member, the C-clamp having a flange;

a wire clamp plate that is pivotally connected to the flange;

a wire clamp comprising a first wire clamp jaw fixed to the wire clamp plate and a second wire clamp jaw adapted to clamp to a large-gauge electrical wire by adjusting a distance between the first wire clamp jaw the second wire clamp jaw with a threaded wire clamp adjustment member attached to the second wire clamp jaw, the wire clamp being angularly adjustable with respect to the support clamp such that an angle of the wire clamp relative to the support clamp is adjustable;

a support block operably connected to the wire clamp plate having a threaded opening that receives the threaded wire clamp adjustment member to move the second wire clamp jaw towards and away from the first wire clamp jaw whereby the first and second wire clamp jaws are adapted to capture a large gauge wire when the second wire clamp jaw is moved toward the first jaw; and wherein the support clamp adjustment member and the threaded wire clamp adjustment member are not coplanar.

2. The wire support tool of claim 1, wherein:

the wire clamp plate is pivotally mounted to the flange on a pivot member;

an arc-shaped slot is formed in the flange at a radial distance from the pivot member; and the angle of the wire clamp relative to the support clamp can be selectively fixed by tightening a friction member that engages the slot.

3. The wire support tool of claim 1, wherein the support block is supported on first and second spacers that extend from a first side of the wire clamp plate.

4. The wire support tool of claim 3, wherein the first spacer is pivotally attached to the support block to permit the first spacer to be pivoted to an open position to permit a wire to be slid into and out of alignment between the first wire clamp jaw and the second wire clamp jaw.

5. The wire support tool of claim 4, wherein the first spacer comprises a hook that selectively engages a catch to retain the first spacer in a closed position.

6. A method of working on a large-gauge wire comprising:

providing a wire support tool that comprises: a support clamp comprising a C-clamp adapted to clamp to a support structure, the C-clamp having a flange; a wire clamp plate that is pivotally connected to the flange; and a wire clamp comprising a support block with a threaded opening that receives a threaded member, a stationary wire clamp jaw, and an adjustable wire clamp jaw attached to the threaded member whereby the adjustable wire clamp jaw is movable toward and away from the stationary wire clamp jaw, wherein the stationary and adjustable wire clamp jaws are adapted to capture the wire when the adjustable wire clamp jaw is moved toward the stationary wire clamp jaw; the wire clamp being mounted to the support clamp and angularly adjustable with respect to the support clamp such that an angle of the wire clamp relative to the support clamp is adjustable;

clamping the support clamp to a support structure;

adjusting the angle of the wire clamp relative to the support clamp; and clamping the wire within the wire clamp by aligning the wire between the adjustable wire clamp jaw and the stationary wire clamp jaw and adjusting the adjustable wire clamp jaw towards the stationary wire clamp jaw.

7. The method of claim 6, wherein the wire clamp is pivotally mounted to the flange on a pivot member; and wherein an arc-shaped slot is formed in the flange at a radial distance from the pivot member that is engaged by a friction member associated with the wire clamp; the method further comprising:

fixing the angle of the wire clamp relative to the support clamp by tightening the friction member that engages the slot.

8. The method of claim 6, wherein the support block is supported on first and second spacers that extend from a first side of the wire clamp plate and the first spacer is pivotally attached to the support block, further comprising:

pivoting the first spacer to an open position before aligning the wire between the adjustable jaw and the stationary jaw; and pivoting the first spacer to a closed position after aligning the wire between the adjustable jaw and the stationary jaw.

9. A wire support tool comprising:

a support clamp comprising a C-clamp adapted to clamp to a support structure, the support clamp comprising a fixed jaw and movable jaw that moves towards and away from the fixed jaw on a support clamp adjustment member, the C-clamp having a flange;

a wire clamp comprising a first wire clamp jaw and a second wire clamp jaw adapted to clamp to a large-gauge electrical wire by adjusting a distance between the first wire clamp jaw the second wire clamp jaw with a wire clamp adjustment member, the wire clamp being pivotally mounted to the flange of the support clamp on a pivot member and angularly adjustable with respect to the support clamp such that an angle of the wire clamp relative to the support clamp is adjustable; and wherein the support clamp adjustment member and the wire clamp adjustment member are not coplanar; and an arc-shaped slot is formed in the flange at a radial distance from the pivot member; and wherein the angle of the wire clamp relative to the support clamp can be selectively fixed by tightening a friction member that engages the slot.

10. The wire support tool of claim 9, wherein the C-clamp comprises a first leg that supports a fixed jaw and a second leg that supports a movable jaw that can be adjusted towards and away from the fixed jaw.

11. The wire support tool of claim 10, wherein the fixed jaw comprises a transverse flange with spaced apart pads.

12. The wire support tool of claim 9, wherein the wire clamp comprises:

a wire clamp support plate that is pivotally connected to the C-clamp flange; and wherein:

the first wire clamp jaw is fixed to the wire clamp support plate; and the second wire clamp jaw that is movable toward and away from the first wire clamp jaw, wherein the first and second wire clamp jaws are adapted to capture a large gauge wire when the second wire clamp jaw is moved toward the first jaw.

13. The wire support tool of claim 12, wherein the wire clamp adjustment member is a threaded member, the wire support tool further comprising: a support block with a threaded opening that receives the threaded member that is attached to the second wire clamp jaw to move the second wire clamp jaw towards and away from the first wire clamp jaw.

* * * * *